United States Patent Office 2,959,970
Patented Nov. 15, 1960

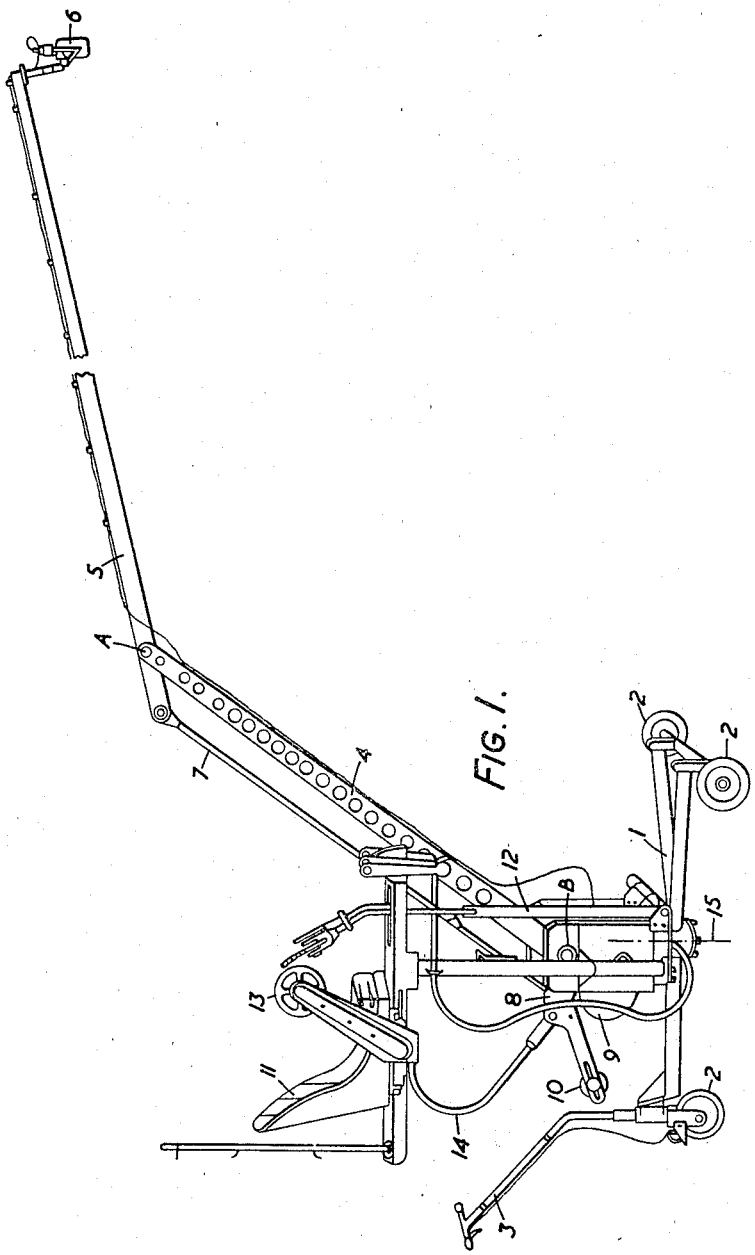

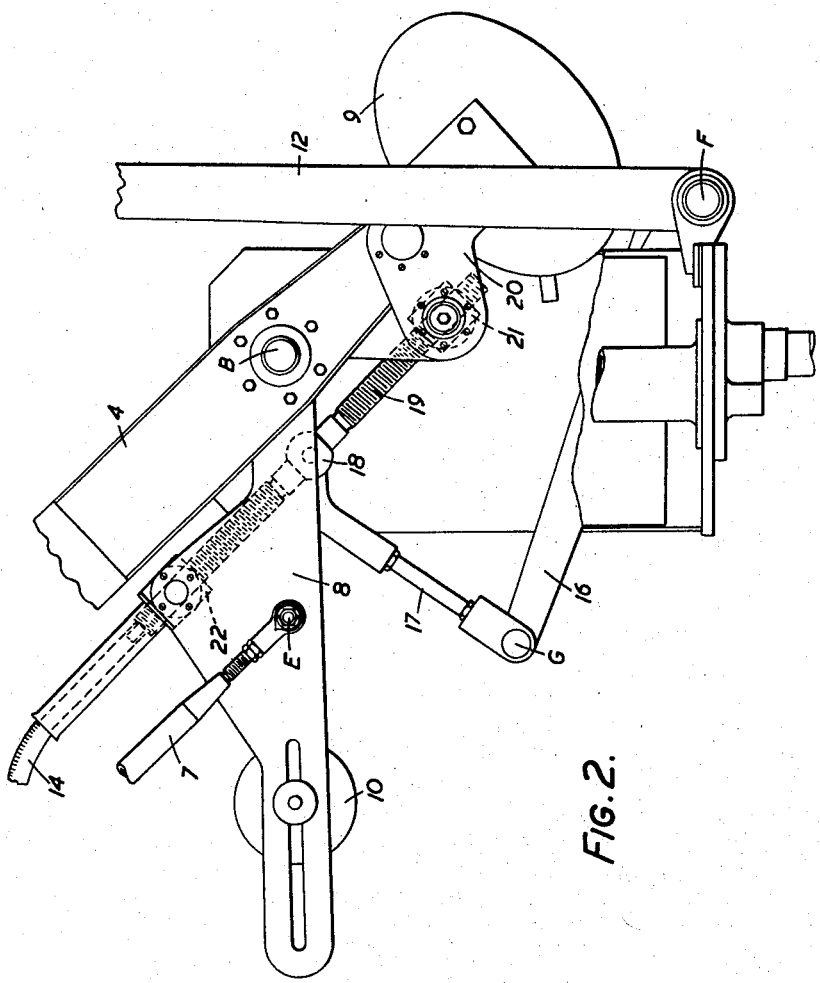

2,959,970

MOBILE SUSPENSION UNITS

John George Gray, Rowlands Gill, England, assignor to Scanners Limited, London, England, a company of Great Britain Filed Dec. 16, 1957, Ser. No. 702,921

Claims priority, application Great Britain Sept. 12, 1957

2 Claims. (Cl. 74—89)

This invention relates to mobile suspension units and more particularly to devices of the nature of those known as "microphone booms" which are widely used in film and television studios for carrying a microphone employed to pick up the sound part of a programme. Obviously such units may be used to carry devices other than microphones if required.

The object of the invention is to provide improved microphone booms and like suspension units in which very accurate, rapid and easily accomplished variation of the position of the device carried may be achieved.

According to this invention a mobile suspension unit for a device such for example as a microphone, includes a carrier spar adapted to carry said device near one end thereof; a quadrilateral linkage consisting of four lever members each of which is pivotally connected between two of the others, two oppositely disposed members being long and the other two being short and one of the short members being constituted by a portion of the length of said carrier spar near the other end thereof; controllable means for swinging said linkage as a whole about a relatively fixed point on one of the two long members, said fixed pivot point being near the end of said member remote from the pivotal point thereof with said spar; and separately controllable means for varying, in any given position of the linkage as a whole, the angle of one of said short members to the long member to which it is pivoted.

Preferably the separately controllable means include an effectively extensible member between one of the short members of the quadrilateral linkage and a point on one of the long members, and means are provided for extending and contracting said effectively extensible member. Preferably also the means for swinging said linkage as a whole comprise a lever engaging and operating upon said effectively extensible member.

A preferred construction comprises a carrier spar; a jib pivoted at one end to an intermediate point near one end of said spar which is remote from that used to carry the microphone or other device and pivoted near the other at a relatively fixed pivot point; a first link member pivoted at one end to said one end of said spar; a further link member pivoted at one end to said first link member at the other end thereof and at the other end to said jib at the relatively fixed pivot point; an effectively extensible member connected between an intermediate point on said further link member and a pivot on the jib and spaced from said relatively fixed pivot point; a controllable lever mechanism engaging said effectively extensible member and adapted, when actuated, to swing the jib about said relatively fixed pivot point; and controllable means for expanding and contracting the effectively extensible member.

The effectively extensible member may conveniently comprise a rotatable rod having right and left hand threaded portions engaging right and left hand nut members mounted one on said further link member and one on said jib.

The invention is illustrated in the accompanying drawings in which Figure 1 is a simplified view showing the general arrangement of a microphone boom in accordance with the the invention but without any great detail; and Figure 2 is a broken away view to a much larger scale than Figure 1 of that part of the mechanism (shown in a different position from that pictured in Figure 1) with which this invention is concerned.

Referring to Figure 1, the microphone boom therein shown has a base with suitably tyred wheels 2 and which can be pushed about by means of a steering and pushing handle 3. On the base is a structure carrying a jib 4 pivoted near one end at a relatively fixed pivot point B and pivoted at the other end at a point A in the length of a carrier spar 5. The spar 5 carries a microphone 6 at its far end. At the other end, a short distance beyond the pivot point A, the spar is pivoted to a rod 7 which, with the jib 4, the portion of the spar 5 between the pivot point A and the adjacent end thereof, and another link 8, constitutes a quadrilateral linkage consisting of four lever members each pivoted at its ends between two of the others. As will be seen two of these lever members, the jib 4 and the rod 7, are long, and the other two are short. Counterbalancing weights 9 and 10 are provided, the latter being adjustable in position along a slot as indicated. If desired the weight 9 may also be adjustable in position to small extent. The operator sits in a seat 11 and has control levers and wheels conveniently to hand, and by means of which he can operate the suspension unit. These control levers and wheels include a joystick control lever 12 by which the jib 4 with the quadrilateral linkage of which it forms part, can be swung about the pivot B, and a hand wheel 13 driving through a flexible shaft 14 a mechanism by means of which the spar 5 can be made to pivot about the pivot point A without moving the jib 4. It is this last mechanism which is provided by the present invention and which provides a very useful additional control of the position of the microphone, allowing the spar 5 to be swung about the pivot A to different angles of tilt. In addition the operator in the seat 11 will normally have further controls enabling the jib 4 to be swung about a vertical axis 15. However, since the present invention is in no way concerned with these additional controls which may be as well known per se, no further description thereof will be given herein.

Referring now to Figure 2, which shows the part of the apparatus provided by this invention, and which is a broken away view showing the mechanism in a different position to that adopted in Figure 1, the jib 4 is povoted at the relatively fixed pivot B and is also pivoted on the same pivot to a link member 8 which is constituted by a structure carrying the adjustable balance weight 10. The other balance weight 9 is on the bottom end of the jib beyond the pivot point B. The lower end of the rod 7 appears in Figure 2 and is pivoted to the member 8 at the point E. The lever 12 is pivoted at a relatively fixed pivot F and is fixed to a crank 16 on the same pivot. The other end of the crank 16 is pivoted at G to a connecting rod 17 which is indicated as of being of adjustable length and whose far end carries a bearing member 18 through which passes a member 19 which is effectively extensible. The member 19 is free to rotate in the bearing 18 but cannot move longitudinally therein. The said member 19 is attached in manner to be described later between a part 20 fixed to the jib below the pivot point B and the upper portion of the member 8.

It will be seen that with the apparatus as so far described, if the control lever 12 is swung about its pivot point F, the jib will be caused to swing about the said pivot point B and during this movement the jib, with the quadrilateral linkage constituted by the parts 4, 8, 7 and the portion of the spar 5 between the point *a* and the adjacent end of said spar, will be restrained to swing as a whole about point B. During movement of the unit by the control lever 12, the locking of the quadrilateral linkage by the adjustable extensible member 19 prevents movement of any of the linkage members relative to any other of the linkage members.

In accordance with this invention, however, an additional controllable motion is obtained by varying the effective length of the member 19. This adjustable member is screw threaded in opposite directions at its opposite ends, one end having a left hand thread and the other a right hand thread. One of these screwed ends screws through a co-operating nut or equivalent member in a bush 21 carried by the part 20 and the other screws through a co-operating nut or equivalent member in a bush 22 in the upper portion of the part 8. The end of the flexible shaft 14 is attached to one end of the threaded rod 19 so that the said rod 19 can be rotated thereby about its own axis. By rotating the rod 19 its effective length, that is to say, the length between the bushes 21 and 22 can be varied. Accordingly, by rotating the shaft 14 the angle between each adjacent pair of members of the quadrilateral linkage can be varied, by relative movements as in the movement of the four arms of a pantograph, without moving the jib and, in the same way, separate control of the angle of tilt of the microphone carrying spar 5 is obtained.

I claim:

1. A mobile suspension unit including a carrier spar adapted to carry a device near one end thereof, said unit comprising a quadrilateral linkage consisting of four lever members each of which is pivotally connected between two of the others, two oppositely disposed members being long and the other two being short and one of the short members being constituted by a portion of the length of said carrier spar near the other end thereof; a rod having oppositely threaded ends; threaded members respectively carried by one of said short members and one of said long members and respectively receiving the oppositely threaded ends of said rod; means for rotating said rod to vary the effective length thereof between said threaded members and thereby vary the relative angular positions of the lever members of the quadrilateral linkage; and controllable means including a lever having a bearing for said rod at an intermediate point in the length thereof for swinging said linkage as a whole and without movement of said members relative to each other about a relatively fixed point on one of the two long members, said fixed pivot point being near the end of said one of said two long members remote from the pivotal point thereof with said spar.

2. A unit according to claim 1 in which one of said long members constitutes a jib and in which said threaded members are mounted respectively on said jib and on said one of said short members.

References Cited in the file of this patent

UNITED STATES PATENTS

| | | |
|---|---|---|
| 1,827,541 | Opperman | Oct. 13, 1931 |
| 2,421,437 | Ryan | June 3, 1947 |
| 2,606,078 | Brock | Aug. 5, 1952 |
| 2,812,869 | Nisperly | Nov. 12, 1957 |

FOREIGN PATENTS

| | | |
|---|---|---|
| 702,161 | Great Britain | Jan. 13, 1954 |